May 14, 1968 G. W. SMITH ETAL 3,383,701
APPARATUS FOR RECORDING SEISMIC SIGNALS
Filed Feb. 15, 1967 4 Sheets-Sheet 1
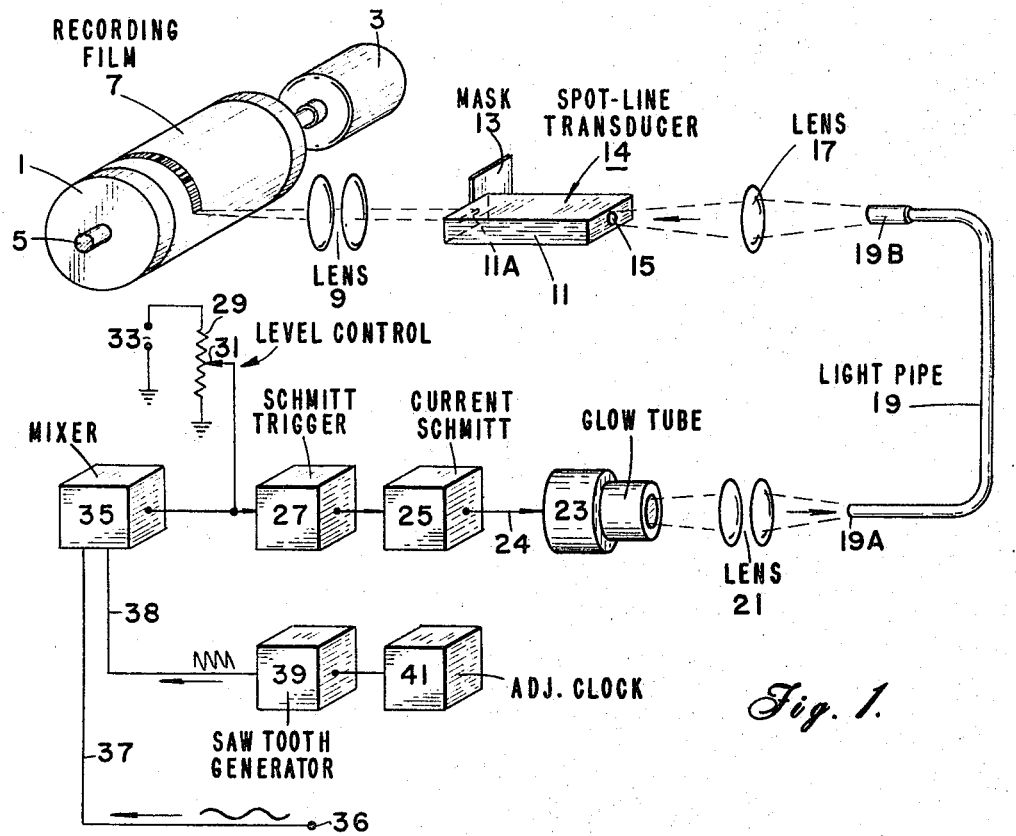
Fig. 1.
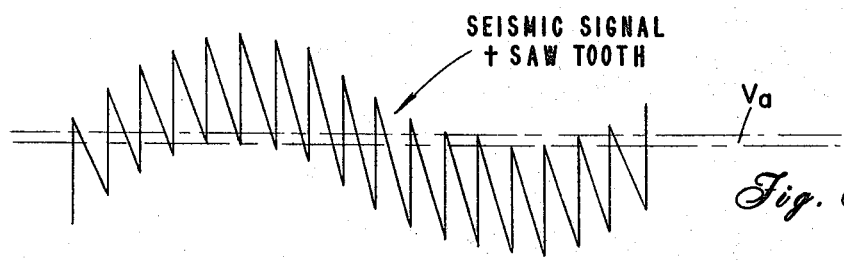
Fig. 9.
Fig. 8.
INVENTORS.
GEORGE W. SMITH,
HARLAND H. HEFFRING,
BY John B Davidson
ATTORNEY

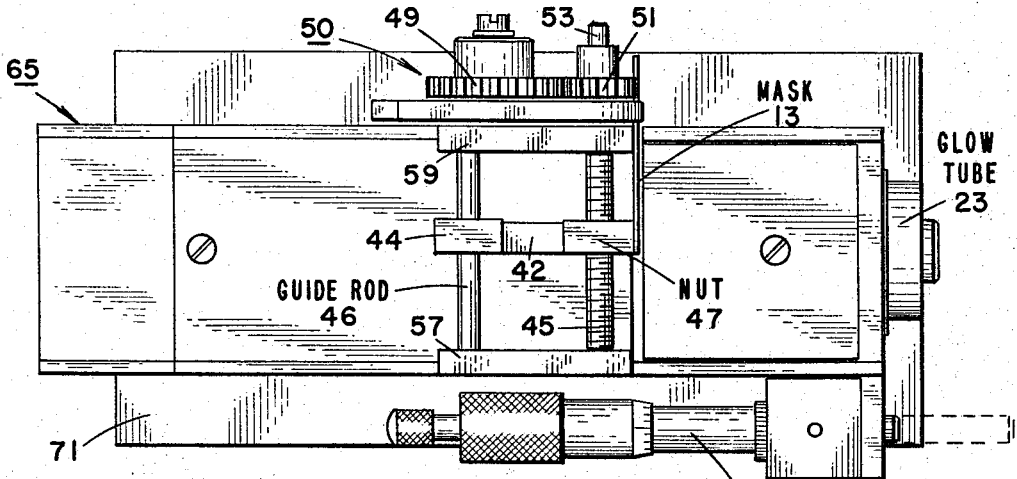
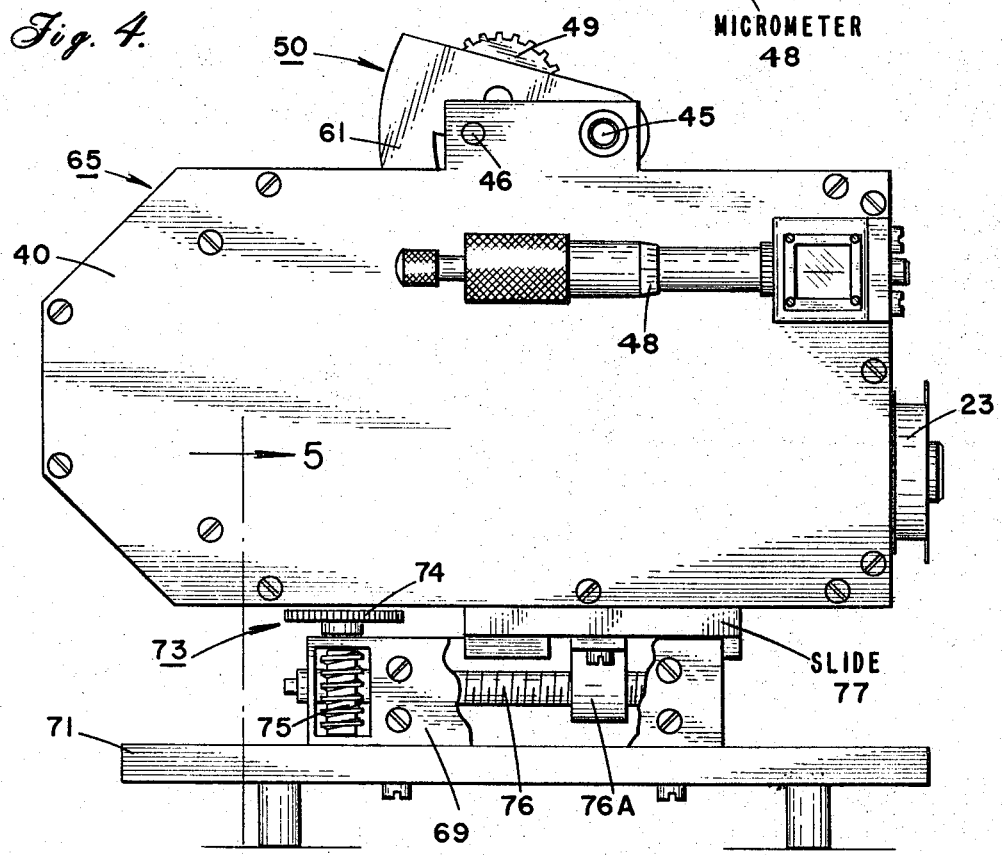

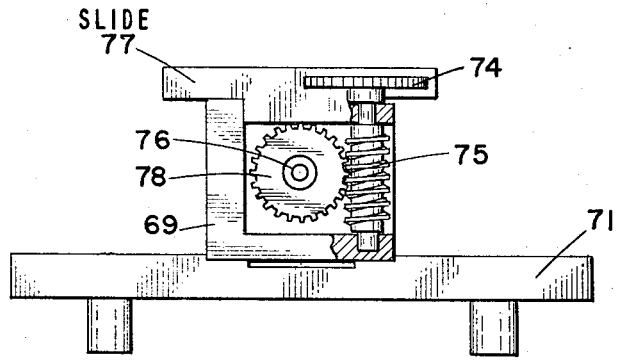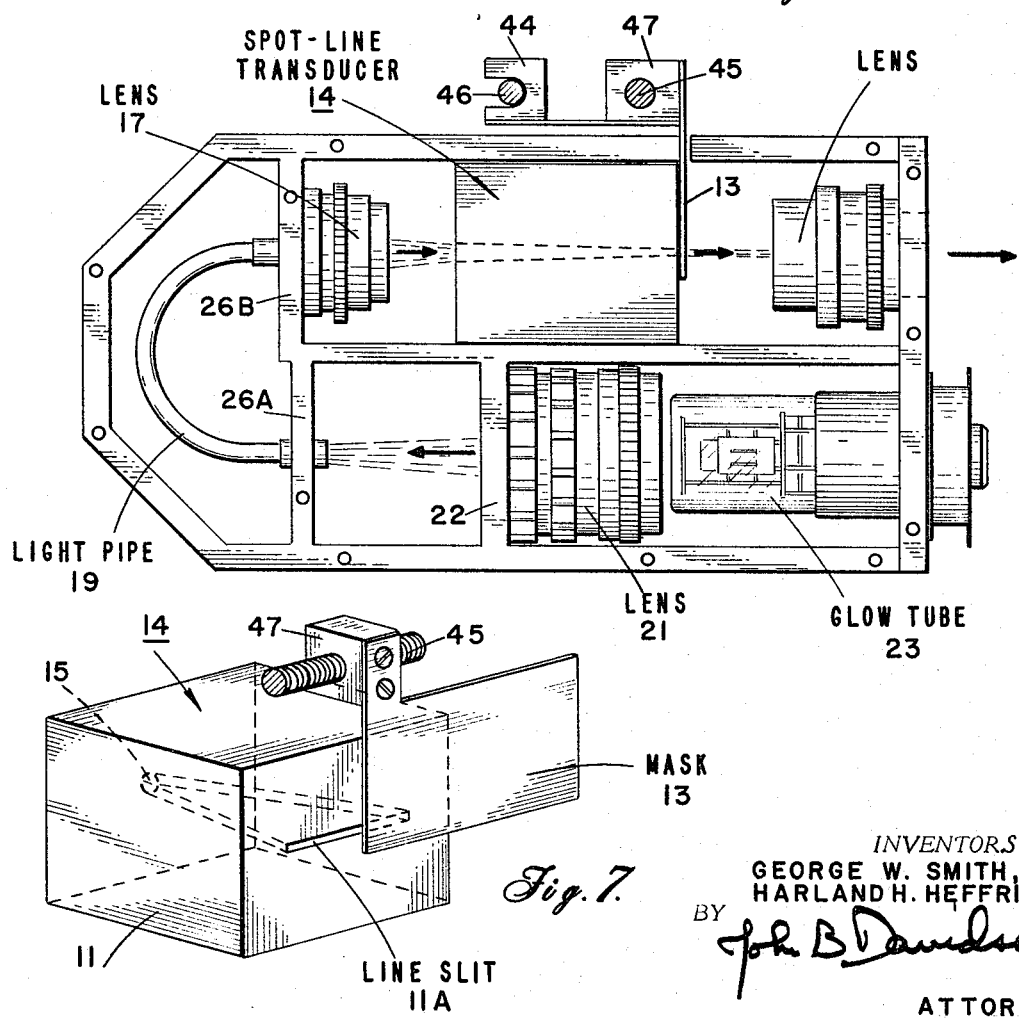

United States Patent Office 3,383,701
Patented May 14, 1968

3,383,701
APPARATUS FOR RECORDING
SEISMIC SIGNALS
George W. Smith and Harland H. Heffring, Calgary, Alberta, Canada, assignors to Esso Production Research Company, a corporation of Delaware
Filed Feb. 15, 1967, Ser. No. 616,397
5 Claims. (Cl. 346—108)

ABSTRACT OF THE DISCLOSURE

A seismic signal recorder wherein light from a pulsed light source is recorded on photosensitive means positioned on a recording drum. The light source is pulsed periodically in accordance with the amplitude of the seismic signal. The seismic signal is combined with a sawtooth electrical signal and applied to a trigger circuit so that the glow tube is pulsed by the trigger circuit when the sum signal is greater than a given value. Light from the glow tube is applied to the photosensitive means through a fiberoptic spot-to-line transducer. A mask across the line side of the transducer adjusts the width of the recorded trace.

Background of the invention

This invention relates generally to recording seismic signals, and more particularly to a seismic recorder for recording signals on a photosensitive recording medium of the type wherein a light source is pulsed at regular intervals for time durations variable as a function of the seismic signal to be recorded, and light from the source is applied to the photosensitive recording medium.

It has been known in the past to use pulsed light sources of the type generally referred to above for the purpose of recording seismic signals on a photosensitive recording means to produce a data trace by suitably moving the recording means. See, for example, U.S. Patent 3,006,713—W. W. Kline, Jr. et al. Apparatus used heretofore for this purpose suffers from several deficiencies. For example, the pulse width modulators used heretofore have not been sufficiently precise to permit accurate control of the "on" and "off" times of the pulsed light source. In addition, the apparatus for conducting light from the light source to the photosensitive recording medium has not permitted accurate control of the light beam such that the trace produced on the recording medium has been generally unsatisfactory for seismic interpretational purposes.

Summary of the invention

In accordance with the present invention there is provided a pulse width modulator for a pulsed light source which is to be pulsed at a constant repetition rate and for a duration functionally related to the amplitude and polarity of a seismic signal wherein a sawtooth generator having an output signal of constant amplitude and constant repetition rate has its output signal combined with that of the seismic signal and used to control a trigger circuit for activating the pulsed light source when the output voltage of the trigger circuit is of predetermined magnitude. The time duration that the sawtooth portion of the combined signal is of greater amplitude than the predetermined amplitude is substantially proportional to the amplitude of the seismic signal. An adjustable bias may be added to the combined signal so that the time intervals over which the light source is pulsed "on" when the seismic signal is of zero amplitude may be suitably adjusted.

In accordance with another aspect of the invention, light from the light source is transmitted to the photosensitive medium by apparatus including a light-tight housing for the light source, a fiberoptic spot-to-line transducer including a plurality of fiberoptic strands connected together at one end in a small area and positioned substantially side-by-side at the other end in a linear array, apparatus including a lens means in the housing for directing light produced by the pulsed light source at one end of the fiberoptic strands, lens means for directing light from the other end of the fiberoptic strands to the photosensitive medium, and an adjustable light stop position between the other end of the strands and the second lens means mentioned above to block light emanating from a selected portion of the linear array of fiberoptic strand ends. Preferably, the housing is adjustably positioned relative to the photosensitive means to suitably focus the light from the second lens system on the photosensitive recording means.

Brief description of the drawings

Objects and features of the invention which are not apparent from the above discussion will become evident upon consideration of the following detailed description thereof taken in connection with the accompanying drawings, wherein:

FIG. 1 is a schematic diagram generally illustrating the apparatus of the invention;

FIG. 3 is a side view of the apparatus of FIG. 2;

FIG. 4 is a top view of the apparatus illustrated in FIG. 2;

FIG. 5 is a side view of the base and carriage assembly of FIG. 2 viewed from the opposite side from which the view of FIG. 2 was taken;

FIG. 6 is a view of the housing 65 and components housed therein assuming plate 40 removed;

FIG. 7 is an isometric view of the spot-to-line transducer 11 and mask 13 illustrated in operation interposition;

FIG. 8 illustrates the output signal from mixer 35 of FIG. 1 showing a single cycle of a seismic signal combined with the sawtooth wave; and FIG. 9 is a trace assumed to be produced by the seismic signal of FIG. 8, both drawn to the same time scale, to illustrate the operation of the apparatus of FIG. 1.

Description of the preferred embodiments

Figure 2:
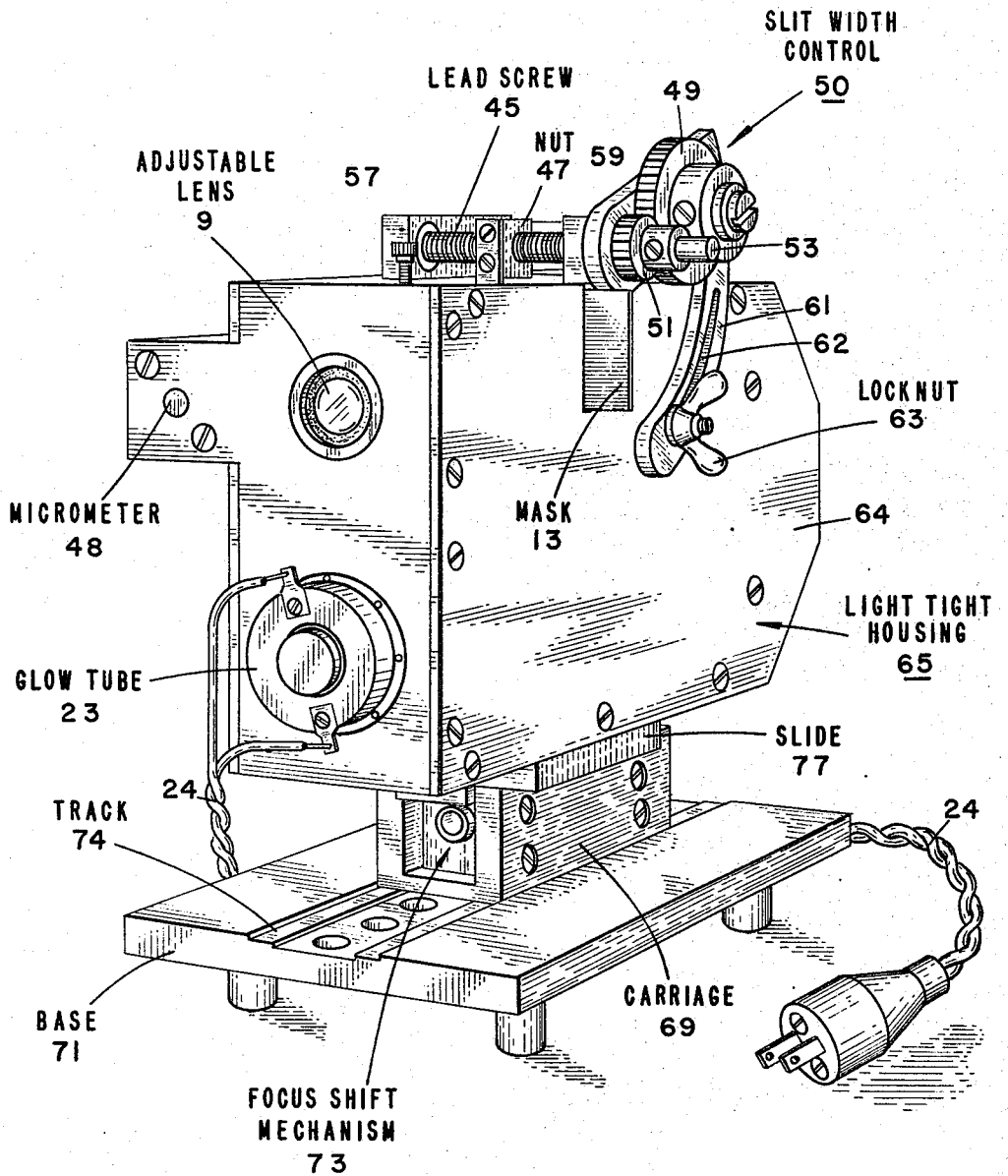
FIG. 2 is a perspective view illustrating a preferred apparatus for housing the glow tube of FIG. 1, and the additional apparatus for transmitting light from the glow tube to the photosensitive recording means.

With reference now to FIG. 1, there is illustrated apparatus for recording a seismic signal applied to terminal 36. A photosensitive recording medium 7, which may be photographic film or photographic paper, is carried by a recording drum 1 of conventional design driven by an electrical motor 3 coupled to the drum by shaft 5. Such a recording drum and drive means is conventional in the art and need not be further described herein. The seismic signal may be the output signal of a geophone or the output signal of a conventional seismic recorder, such as a magnetic tape recorder, which also may be driven by the motor 3 and shaft 5 concomitantly with drum 1. In such event, the output signal from a magnetic reproducing head associated with the recorder will be coupled to the terminal means 36.

The seismic signal appearing at terminal means 36 is applied to a mixing circuit 35 along with a sawtooth signal of constant amplitude and repetition rate. The sawtooth signal may be derived from an electrical signal generating means comprising a sawtooth generator 39 driven by the output signal of an adjustable clock circuit 41. The pulse repetition rate of the output signal of the sawtooth generator is controlled by the adjustable clock such that the sawtooth generator produces not less than 100 pulses for each inch of movement of the recording medium. The output signal of the mixing circuit 35 is applied to the Schmitt trigger 27 directly, and a D.C. source 33 is connected through potentiometer 29 having an adjustable tap 31 to the Schmitt trigger 27. The level control functions to add a small bias to the output signal of the mixing circuit 35 to adjust the turn-on level of the Schmitt trigger 27. Schmitt trigger 27 drives a current Schmitt trigger circuit 25 to provide sufficient current for energizing glow tube 23, to which the current Schmitt circuit 25 is connected by line 24. Light emanating from the glow tube 23 is directed to one end 19A of a light pipe 19 by means of an adjustable lens system 21. Light emanating from the other end 19B of light pipe 19 is directed to the spot end of a spot-to-line transducer 14 by means of a lens 17. The spot-to-line transducer 14 preferably comprises a light-tight housing 11, within which are arranged a multiplicity of fiberoptic strands, each comprising a plurality of fiberoptic filaments. The strands are connected together at one end 15 to form a very small light-receiving area. At the other end the strands are linearly arranged so that a thin line of light emanates therefrom. An adjustable mask 13 is positioned across the line of fiberoptic strand ends to control the length of the line of light. The light is collected by an adjustable lens 9 and directed at the film 7.

The operation of the apparatus of FIG. 1 is as follows. Assume that only a sawtooth signal is applied to mixer 35 or that no signal is applied to terminal 36. The tap 31 is adjusted until the signal recorded on film 7 has equal black (or exposed) and clear intervals. When a seismic signal is applied to terminal 36, the recorded signal will be such that the black intervals will be broader than the clear intervals when the seismic signal is of a positive polarity, and will be narrower than the clear intervals when the seismic signal is of negative polarity. The amplitude of the sawtooth generator output signal will be adjusted so that the recorded signal is entirely black at some maximum amplitude of the seismic signal, and clear at some minimum amplitude of the seismic signal.

In FIG. 8 is illustrated a single cycle of an assumed seismic signal waveform and, superimposed thereon, the waveform of that particular single cycle combined with the output of sawtooth generator 39. Schmitt trigger circuit 27 is triggered "on" at a voltage level $V_a$ and will saturate at a slightly larger voltage level. The glow tube 23 will be substantially concomitantly pulsed "on" and "off" with actuation of the Schmitt trigger circuits 25 and 27. The result will be a trace on film 7, such as is illustrated in FIG. 9, where the black and clear intervals are equal when the seismic signal is of zero magnitude, is entirely black when the seismic signal reaches maximum magnitude, and clear when it reaches minimum magnitude. The seismic waveform is assumed to vary between the largest maximum and minimum magnitudes expected to be recorded. Manifestly, however, most events recorded probably will have smaller magnitudes.

With reference now to the recording head illustrated in FIGS. 2-7, there is seen a light-tight housing 65 supported on a substantially planar base member 71 by means of an adjustable carriage 69 and a slide 77. The adjustable carriage 69 is affixed to a track recess 74 in the base member 71. As illustrated most perspicuously in FIG. 3, the slide 77 is affixed to the light-tight housing 65 and slidably moved across the upper surface of the carriage 69 by adjustment of a focus shift mechanism 73 comprising a worm gear 75 in the carriage 69, a threaded shaft 76 also supported in the carriage 69, and a nut 76A on the shaft 76 and affixed to the slide 77. By rotating the worm gear 75 and pinion gear 78, the shaft 76 is also rotated, thus moving the slide 77 and the housing 65 laterally along the upper surface of the carriage 69. The glow tube 23 is positioned within the light housing 65 so that its base extends from the housing to permit leads 24 to be connected to the electrical terminals thereof, which are respectively connected to the anode and cathode of the glow tube. Lens 21 is supported on wall 22 of a light-tight cavity within the housing 65. Light pipe 19 is positioned through walls 26A and 26B such that light from the glow tube 23 may be directed at one end thereof. Lens 17 affixed to wall 26B directs light from the other end of the light pipe to spot-to-line transducer 11. Lens 9 is supported on the same wall as the glow tube 23 so that light received thereby is directed away from the housing 65 to the photosensitive recording medium. A micrometer 48 is positioned on the housing 65 to measure the distance from the housing to the recording medium. Thus, when it is necessary to work on the apparatus, as for maintenance, the apparatus may be quickly repositioned with a minimum amount of lost time.

With reference particularly to FIGS. 2, 4, and 7, there is illustrated apparatus for conveniently reducing the lateral dimension of the trace produced by the apparatus. A mask 13 slides through a slot in the housing 65 across the line end 11A of the fiberoptic array of spot-to-line transducer 11 so as to block light emanating from a selected number of filaments in the array. The mask is moved laterally across the array by a nut 47 to which the mask is affixed. The nut 47 threadedly engages an elongated threaded shaft 45 and is also connected to a slide member 44 slidably positioned on a guide rod 46 such that the nut 47 is not rotated upon rotation of shaft 45, but, instead, moves longitudinally along the shaft. The shaft 45 is rotated by means of a gearing arrangement comprising a pinion gear 51 and a drive gear 49. The drive gear 49 is rotated by an arm 61 connected thereto and having a positioning slot 62 therein. A lock nut 63 in the slot 62 is affixed to the plate 64 to lock the arm 61 against rotation at any desired position thereof. In practice, the lock nut 63 is removed and the drive gear 49 is rotated so that the slit width mask is laterally moved until a trace of the desired dimension is produced on the photosensitive recording medium 7 as a result of light emanating from lens 9.

When the apparatus described immediately above is assembled, the lens 21 is adjusted so that light from glow tube 23 is concentrated on the light pipe 19. Lens 17 is then adjusted so that light from the light pipe 19 is focused on the spot end of the spot-to-line transducer 11. The entire apparatus is thereupon shifted by means of the focus shift mechanism 63 so that light from the lens 9 is suitably focused on the photosensitive recording medium 7. The width of the light impinging on the medium 7 is thereupon adjusted by laterally moving the mask 13, as described above.

The principle of the invention and the best mode of applying that principle has been described, but it is to be understood that the apparatus is illustrative only and that other means can be employed without departing from the true scope of the invention.

The embodiments of the invention in which an exclusive property or privilege is claimed are defined as follows:

1. Apparatus for recording a seismic signal wherein a pulsed light source is produced at a constant repetition rate and for a duration functionally related to the amplitude and polarity of the seismic signal, and the light produced by the source is recorded as a time function on a photosensitive recording medium positioned on a photosensitive medium transport means, the improvement comprising:

a sawtooth generator having an output signal of constant amplitude and constant repetition rate;

first circuit means connected to the sawtooth generator for additively combining the output signals of the sawtooth generator and the seismic signal to be recorded;

trigger circuit means connected to the light source and to the first circuit means for activating said pulsed light source when the output voltage of said first circuit means is of predetermined magnitude.

2. The apparatus of claim 1 further including means for adding an adjustable bias voltage to the output voltage of said first circuit means.

3. The apparatus of claim 1 further including a light-tight housing for said light source, a fiberoptic spot-to-line transducer including a plurality of fiberoptic strands connected together at one end in a small area, and positioned substantially side by side in the other end in a linear array, means including lens means in said housing for directing light produced by said pulsed light source at one end of said fiberoptic strands, lens means for directing light from the other end of said fiberoptic strands to said photosensitive medium, and an adjustable light stop positioned between the other end of said strands to block light emanating from a selected portion of the linear array of fiberoptic strand ends.

4. The apparatus of claim 3 further including means for positioning said housing relative to said photosensitive transport means.

5. The apparatus of claim 3 further including a planar base member, an adjustable carriage on said base, a worm gear supported by said carriage, a threaded shaft rotatably supported in said carriage and engaging said worm gear so that rotation of said worm gear will rotate said shaft, a nut on said shaft affixed to said housing, said housing being slidably supported on said carriage so that movement of said nut on said shaft will slide said housing on said carriage.

References Cited
UNITED STATES PATENTS 3,006,713  10/1961  Klein et al. _____ 346—108

RICHARD B. WILKINSON, *Primary Examiner.*

J. W. HARTARY, *Assistant Examiner.*